US 7,419,100 B2

(12) United States Patent
Groeneboer et al.

(10) Patent No.: US 7,419,100 B2
(45) Date of Patent: Sep. 2, 2008

(54) METHOD AND SYSTEM FOR EXECUTING DOCUMENT SCANNING JOBS THAT ARE INTENDED FOR A REMOTE WORK STATION THROUGH USING A WIRELESS INTERCONNECTION BETWEEN THE WORK STATION AND A SCANNER FACILITY

(75) Inventors: Dennis W. J. Groeneboer, Ijmuiden (NL); Robertus C. W. T. M. Van Den Tillaart, Gemert (NL)

(73) Assignee: Océ-Technologies B.V., Venlo (NL)

( * ) Notice: Subject to any disclaimer, the term of this patent is extended or adjusted under 35 U.S.C. 154(b) by 219 days.

(21) Appl. No.: 11/156,712

(22) Filed: Jun. 21, 2005

(65) Prior Publication Data

US 2005/0279835 A1 Dec. 22, 2005

(30) Foreign Application Priority Data

Jun. 22, 2004 (EP) ................................. 04076825

(51) Int. Cl.
*H04N 1/04* (2006.01)
*G06F 3/00* (2006.01)

(52) U.S. Cl. .................. 235/472.01; 358/474; 358/505; 715/243; 715/717

(58) Field of Classification Search ............ 235/472.02, 235/472.01; 358/474, 500, 505; 455/41.3; 715/243, 700, 717
See application file for complete search history.

(56) References Cited

U.S. PATENT DOCUMENTS

2002/0186420 A1 12/2002 Wu
2002/0196477 A1* 12/2002 Chen ........................ 358/474
2004/0227979 A1* 11/2004 Chen ........................ 358/474
2005/0036509 A1* 2/2005 Acharya et al. ............ 370/466
2005/0064920 A1* 3/2005 Luthra ..................... 455/575.4

FOREIGN PATENT DOCUMENTS

CN 1471293 A 1/2004
EP 1 096 775 A2 5/2001

OTHER PUBLICATIONS

Research Disclosure #444001, Apr. 2001, p. 511.

* cited by examiner

*Primary Examiner*—Daniel A Hess
(74) *Attorney, Agent, or Firm*—Birch, Stewart, Kolasch & Birch, LLP

(57) ABSTRACT

A method and system are described for executing document scanning jobs intended for a remote work station through using a wireless connection between the work station and a scanner facility. When a user, carrying a mobile device, approaches a multifunctional reproduction device, automatically a scanning template will be uploaded from the mobile device to the multifunctional device. In case the user now makes himself known to the multifunctional device and prepares for a scan job, at the user interface of the multifunctional device, the scan template will be displayed for further specification of the scan job by the user. After completion of the scan job the scanned data is downloaded to the mobile device. When the connection is closed the scanning template and data belonging to the scan job are removed from the multifunctional device.

21 Claims, 3 Drawing Sheets

METHOD AND SYSTEM FOR EXECUTING DOCUMENT SCANNING JOBS THAT ARE INTENDED FOR A REMOTE WORK STATION THROUGH USING A WIRELESS INTERCONNECTION BETWEEN THE WORK STATION AND A SCANNER FACILITY

This application claims the priority benefit of European Patent Application No. 04076825.1 filed on Jun. 22, 2004, which is hereby incorporated by reference.

BACKGROUND OF THE INVENTION

1. Field of the Invention

The invention relates in general to a method and system for scanning a document, the document being taken in its broadest technical sense, such as including those that contain informal matter. Optical scanning is in wide use for introducing matter from outside into a computer environment without necessitating preprocessing of such matter before the scanning. More in particular, the present invention relates to the use of such optical scanning viz à viz a plurality of work stations in a comprehensive administrative organization without the imposing of an extensive set of rules, and whilst allowing in particular the use of mobile workstations or mobile devices, such as laptops, PDA's and the like, that feature a wireless interconnection to the scanning facility.

2. Discussion of the Background Art

Prior art as documented in Research Disclosure, April 2001, p. 511, # 444001 discloses such system for use with a scanning facility and only a single mobile device. The overall procedure goes with activating the mobile device in a receive mode, executing the scanning, packaging the document, and then wirelessly transmitting it. In particular, every step requires user intervention.

However, the present inventors have recognized that especially in a larger organization, easy-to-follow procedures, security measures, and multi-station facilities are a must. In particular, the application program should better run in the background of other operations, and various settings should be attained automatically.

SUMMARY OF THE INVENTION

Therefore, the present invention vies to introduce a great amount of flexibility into the system for realizing an extremely friendly user interface whilst maintaining the strictest standards for safe and effective processing, and inter alia, allowing the use of a plurality of such mobile devices in a transparent and parallel manner.

Now therefore, according to one of its aspects, the invention provides a method for executing document scanning jobs intended for a mobile device through using a wireless interconnection between the mobile device and a scanner facility, said method comprising the steps of: establishing a wireless connection between the mobile device and the scanner facility, at the mobile device, transmitting a scanning template and appropriate identifier via the established connection, at the scanner facility, receiving the scanning template and the identifier via the established connection, displaying the received scanning template having at least partially completed user specification for specifying an associated scan job and thereupon awaiting a completion to the user specification if appropriate through a user interface pertaining to the scanner facility and a job start indication, and thereupon executing the scan job as specified to create a scan job file and associated meta data, and at the scanner facility, transmitting the scan job file and associated meta data through the established connection to the mobile device and thereupon closing the connection and subsequently removing the scanning template.

By itself, earlier European Patent Application Publication No. EP 1096775 of the same assignee as the present invention discloses a method for at a scanner facility selecting the type of a scan job to create a scan data file and associated meta data specifying the above type, for subsequently transmitting the file and the meta data, and for under control of the meta data processing the scan data file for further usage. Various aspects of mobility as pertaining to the work stations that have not been considered in the above-referenced European Patent Application are considered in the present invention. The entire contents of the above-referenced patent application are herein incorporated by reference.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

These and further features, aspects and advantages of the invention will be discussed more in detail hereinafter with reference to the disclosure of preferred embodiments of the invention, and in particular with reference to the appended Figures that illustrate.

DETAILED DESCRIPTION OF PREFERRED EMBODIMENTS

Figure 1:
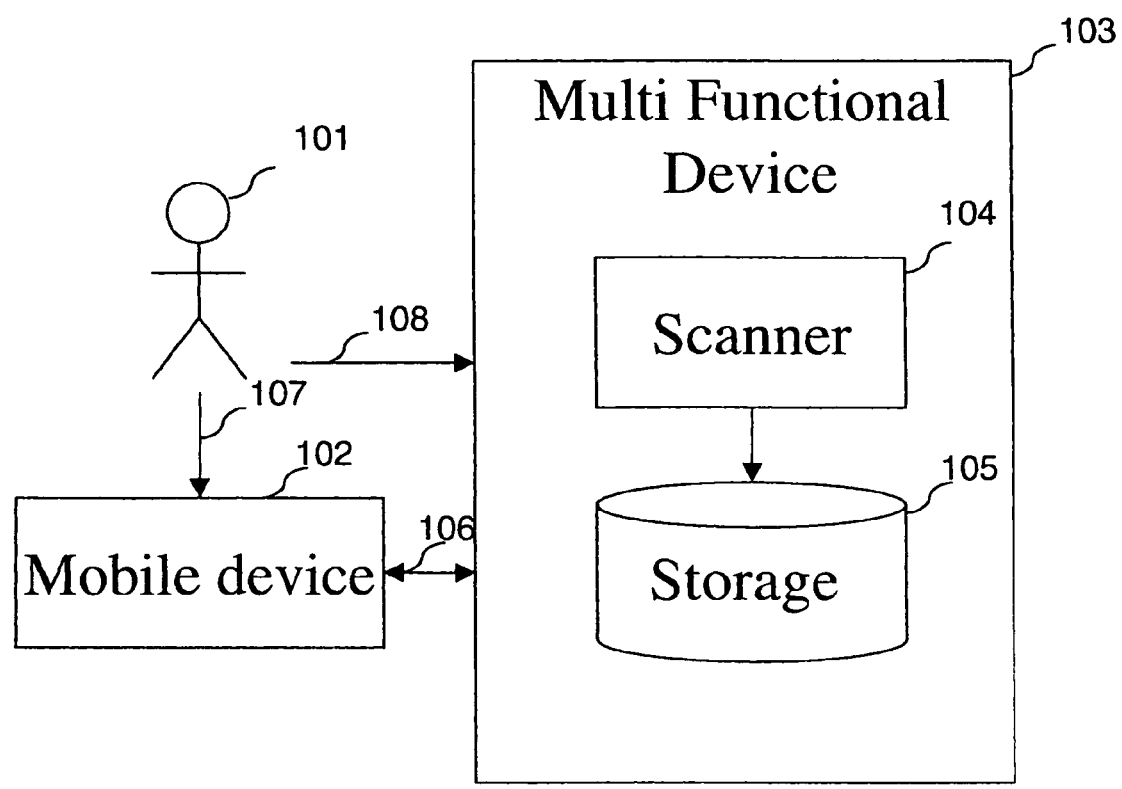
FIG. 1 shows a set-up of a single-user system according to the present invention.

FIG. 1 illustrates a set-up of a single-user system according to the present invention. Here, a user 101 with a mobile device 102 makes a scan, operating through the user interface of the multifunctional device 103, and the result of the scanning is saved on the mobile device or at the multifunctional device. Device 103 comprises the scanner 104 and storage 105 as part of a more or less comprehensive data processing arrangement. Mobile device 102 and multifunctional device 103 are able to communicate with each other via a wireless link 106. Interaction of the user with the mobile device and multifunctional device at respective local user interfaces is indicated respectively with arrows 107 and 108. The various interactions will be more detailed described next.

Presumption is that a wireless adapter in the mobile device 102 is active. The mobile device enters the reception area of the multifunctional device 103. Automatically a connection between the multifunctional device and the mobile device is established. After the establishment of the connection, automatically a user id and a scan template are uploaded from the mobile device towards the multifunctional device through the wireless link 106.

Generally, such scanning template operates like a job specification or "form" that has partially been filled in. The multifunctional device is now prepared to carry out any scan tasks in combination with the mobile device. If the user 101 now starts a scan task at the local user interface of the multifunctional device, on this local user interface the scan template is presented to the user and the user either does not change or specify any of the settings and thus uses all default settings, or the user specifies or modifies one or more parameters to fully define the job as desired. A single user may need a plurality of scanning templates for respectively associated scan jobs.

After the scan job is completely specified, the user supplies the hardcopy documents, comprising one or more pages, to the scanner 104 of the multifunctional device for scanning. The document is scanned by the scanner 104 and the multifunctional device saves the result of the scan in an associated file, such encompassing appropriate meta data of the scanning operation, and this file is automatically downloaded to the mobile device. However, in another embodiment, the scanned document is saved in a mailbox, provided by the multifunctional device as part of storage 105, or provided by a system where the multifunctional device is part of. Later on then, the user is able to download the scanned file from the mailbox.

After termination of the job, the scanning template remains on the multifunctional device as long as a communication channel between the mobile device and the multifunctional device remains open. At the moment the communication channel is closed, e.g. because the mobile device is out of the reach of the multifunctional device, the scanning template is removed from the storage of the multifunctional device.

A few preconditions of the above procedures are that the multifunctional device 103 and the mobile device 102 should have the same communication protocol. For connecting devices via a wireless link, a variety of standards and configurations are in existence. A recent standard being IEEE 802.11g may be used, wherein configurations possible in this standard are an ad hoc mode and an infrastructure mode. The invention brought forward here is independent of protocol, standard and configuration used. For the invention to be carried out, what is needed from the wireless infrastructure are means for establishing a connection between the mobile device and the multifunctional device. The way in which such a connection is established, is dependent of the used standard and configuration. In the current description, the standard IEEE 802.11g is considered to provide the necessary underlying framework. However the invention should not be considered to be limited to the usage of this standard. The invention is envisaged to be used also in combination with any future standards. In case of the mentioned standard, when a wireless adapter in a device is turned on or activated, it begins to scan across the wireless frequencies for wireless access points or wireless clients working in ad hoc mode. In dependence of configuration parameters, the wireless adapter makes a connection with an appropriate other wireless adapter on the basis of signal strength and frame error rate information. Next the wireless adapter switches to the assigned channel of the selected wireless adapter and negotiates the usage of a port. Via this port, applications will communicate with each other. In the description this communication channel is referred to as a 'connection'. If the signal strength becomes too low, the error rate too high, the adapter will scan for other adapters, in case of working in the infrastructure mode, or the connection will be terminated.

Figure 2:
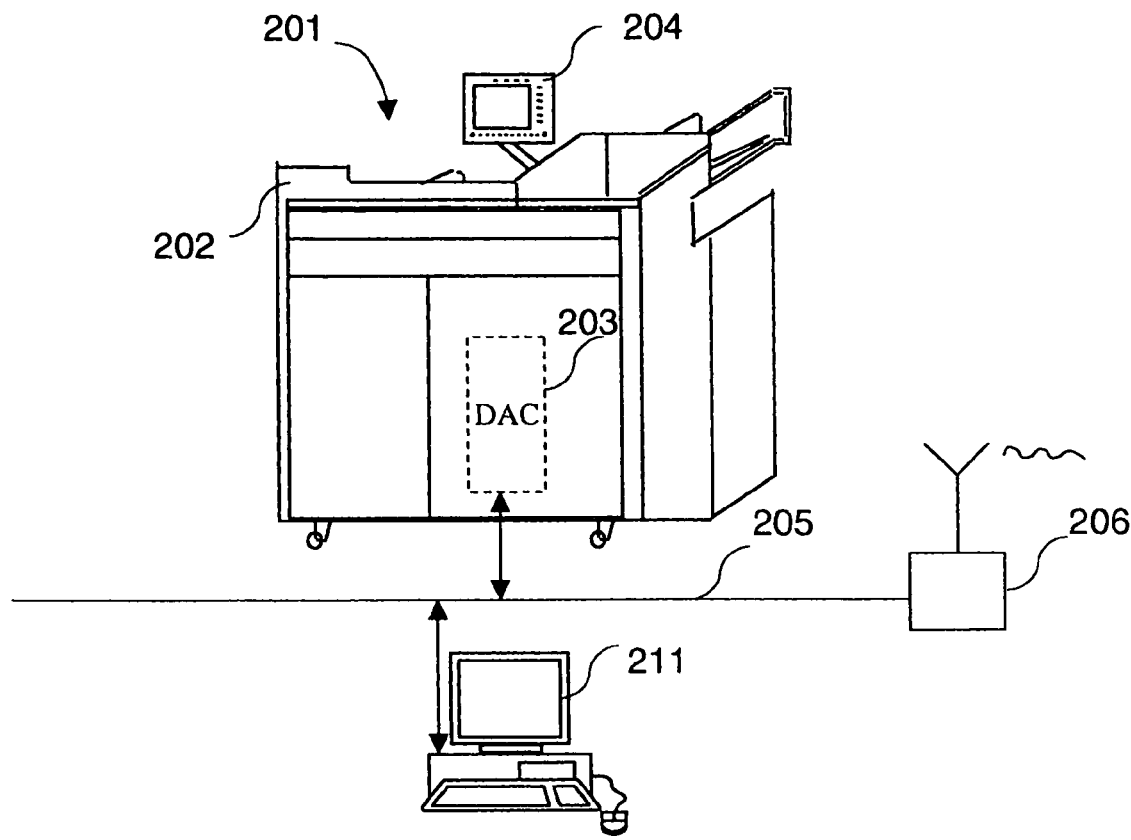
FIG. 2 is a diagram of a multi-user system arrangement.
Figure 2:
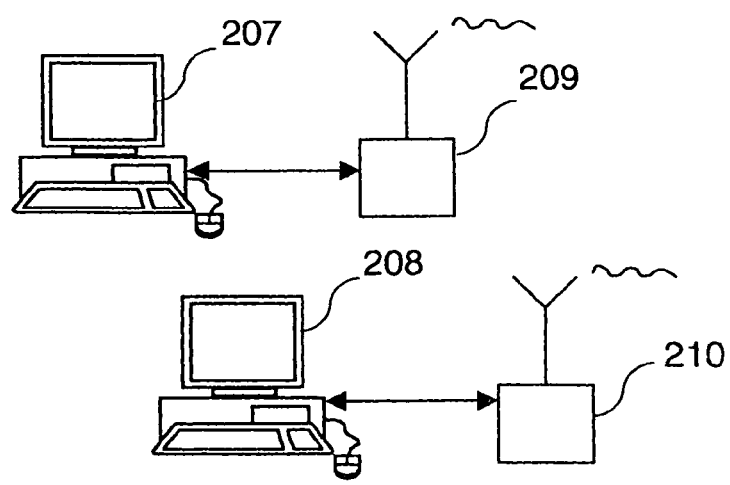

FIG. 2 illustrates a multi-user system arrangement, through using various elements of FIG. 1 of the European Patent Application referenced supra. Here as shown in FIG. 2, a multifunctional device 201 as depicted is provided with a scanner facility 202 and a suitable controller 203, that allows a user to specify all relevant commands, parameters, etc. to the apparatus via local user interface 204. Moreover, the scanning facility is connected to a network 205 and to a wireless adapter 206 that allows setting up wireless connections with a plurality of work stations 207, 208. Note in particular the associated antenna. Although the latter work stations have summarily been depicted as desktop computers, they could as well be laptops or other portable or mobile devices. The work stations have respective wireless adapters 209, 210 with antennas shown that likewise participate in the wireless connection. Finally, the system features server facility 211 that is likewise connected to the network 205. Together, the scanner facility 202, server facility 211, network 205 and wireless adapter 206 constitute the multifunctional device 103 shown in FIG. 1, although generally, only a limited subset of the functions present therein would already be sufficient to implement the present invention.

Figure 3:
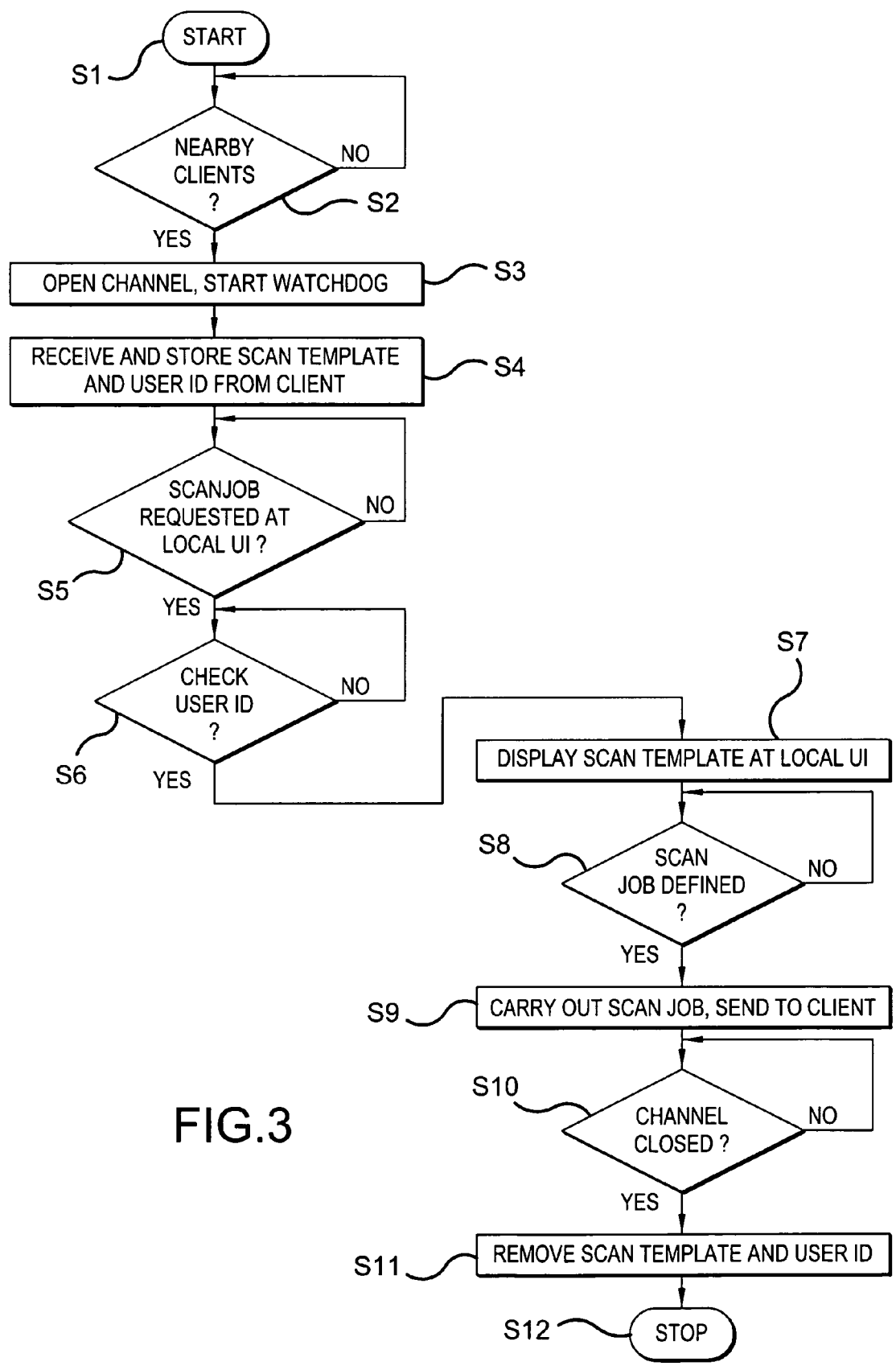
FIG. 3 is a flow chart delineating the general sequence of operations of a scanning job.

FIG. 3 illustrates a flow chart for steps to be carried out on the multifunctional device (e.g., the multifunction device of FIG. 1 or 2) according to the present invention, delineating the general sequence of operations that pertains to a scanning job. Referring to FIG. 3, various loops have been shown that generally operate as waiting loops. If the waiting takes too long, the loop in question can be left for return to the starting block, which return for clarity has not been shown here in detail.

Generally, the process starts in block S1, with allocating the relevant hardware and software facilities. As from this moment, the scanning application will be running in the background of possible further applications, and will become activated upon prespecified calling actions made thereto. Now, in the envisaged configurations, the various mobile devices must be "in the neighborhood" of the scanning facility. In accordance with a prespecified purpose, such neighborhood may extend over a bigger or smaller office room, a so-called "office garden", or even larger, so that distances may possibly vary from 1 to some 50 meters or the like.

By itself, the neighborhood is implicitly defined as an area wherein the wireless signal strength attains a predetermined threshold value. The reaching of the threshold will automatically trigger the uploading of the scanning template in the background, without necessitating explicit user intervention. The realization is through an active process on the mobile device that, intermittently, actively searches for a scanner facility in the neighborhood. Such searching process may of course be selectively de-activated by a user person. The realization is that in a work station according to the invention, in the background a broadcast transmission process is running that drives transceiver hardware for broadcasting an identifying signal. The process also allows for dynamic allocation of an address upon receiving a return signal from a scanning station, so that a plurality of work stations may be signed up in parallel to a single scan station.

Now, in block S2, the presence of client work stations nearby is verified. If positive, the system goes to block S3, wherein the communication channel to a client so found is opened, and a watchdog timer is started. Thereupon, in step S4, through the opened communication channel the scanner facility will receive and store a scanning template from the user, and also an appropriate unique identity, that may pertain either to the user as a person, or rather to the apparatus held by the user, such in case of the user's identity not being unique. For example, the user may have more than one work station. In the background, the ID received is checked against a set of acknowledged identities, by means of an authentication procedure and furthermore, a book-keeping account may be opened or accessed for subsequent usage, such as for financial or managerial purposes. Note that the above settings are effected at the scanner facility, rather than at the respective workstation.

An additional facility or the scanner facility may be provided with "guest accounts" that allow a limited set of services only. An example of such limitation would be that immediate payment for services is required. Such payment could be effected through a coin input facility, through a debit- or credit-card facility, or otherwise.

In particular, the scan template could comprise one or more of the following: a time stamp, a scan job name, a destination, a transport encryption definition, and one or more scan job parameters, such as single/double sided, a zoom parameter, a source document format and a scan resolution.

Next, in block S5, again constituting a waiting loop, the system detects reception of a request for a scan job at the local user interface of the multifunctional device. The implementation of such request can be that the user selects the assigned user name on the User Interface (UI) of the scanner facility. If positive, in block S6, again constituting a waiting loop, the user ID is checked for correctness, possibly in combination with a secret password. The above accounting can be based on this authentication code. If accorded, in block S7 the actual scanning template is displayed at the local User Interface. Such template can be the previous scanning template pertaining to the user in question, or a scanning template pertaining to the document in question, or rather a default scanning template. Anyway, the current user may adjust the settings of the scanning template. Note that users will not share a scanning template, inasmuch as the destination address cannot be shared among them.

Next, in block S8, which again operates as a waiting loop, the system checks whether the scan job has now been completely defined. If positive, the scan job is effectively carried out in block S9, and the result thereof is sent to the client user. Depending on various operative parameters, the scanning and transmitting can be executed serially or in parallel, such as on a per page, per line, or other basis. As a specific aspect proper to the wireless transmission, the transport speed can be made subject to the wireless signal strength. At the work station, a visual identifier will give feedback to the user concerning the progress of uploading the scan job.

If the signal strength is below a certain threshold, the data transmission is stalled, inasmuch as transmitting only part of a scan job is expected to cause serious distress. As a secondary measure, the scanning will then nevertheless be executed, but the scan data will then be saved for a predetermined period of time, such as a few hours or a work shift. The scan data will then be stored under encryption e.g. with the public encryption key of the work station user. Due to actual circumstances, a communication channel may be broken temporarily. The above incomplete transfer may cause an alarm signalization to the user to notify the user of the incomplete transfer. Upon re-establishing of the channel, it is possible to resume the automatic transmission, because the work station will have the correct decryption key.

After termination of the scanning and transfer, the job is removed from the multifunctional device, where after the effective closing of the communication channel is detected in block S10, such detecting again constituting a waiting loop. The detection is triggered by the watchdog, supra. In particular, the communication channel could be managed in such way where the communication channel is closed upon one or more of the following events occurring:

a user request for closure at the scanner facility
    a user request at the work station
    a watchdog-controlled delay period elapsing
    a signal strength pertaining to the wireless connection falling below a threshold.

After closing the communication channel, in block S11 the scan template is removed automatically from the memory of the scanner facility. The user ID is rendered invisible, but kept for accounting purposes. Finally, in block S12 the process terminates. In several aspects, the diagram as shown is a simplification. For example, the various waiting loops need not terminate in an identical return state; some of them could trigger an alarm to the user to alert the user of certain situations, such as incomplete transfer, whereas others could find that the user had cancelled the scanning purposely.

The processing steps of the present invention are implementable using existing computer programming language. Such computer program(s) may be stored in memories such as RAM, ROM, PROM, etc. associated with computers. Alternatively, such computer program(s) may be stored in a different storage medium such as a magnetic disc, optical disc, magneto-optical disc, etc. Such computer program(s) may also take the form of a signal propagating across the Internet, extranet, intranet or other network and arriving at the destination device for storage and implementation. The computer programs are readable using a known computer or computer-based device.

Now, the present invention has here above been disclosed with reference to preferred embodiments thereof. Persons skilled in the art will recognize that numerous modifications and changes may be made thereto without exceeding the scope of the appended Claims. In consequence, the embodiments should be considered as being illustrative, and no restriction should be construed from those embodiments, other than as have been recited in the Claims.

The invention claimed is:

1. A method for executing document scanning jobs intended for a mobile device through using a wireless interconnection between the mobile device and a scanner facility, said method comprising the steps of:

establishing a wireless connection between the mobile device and the scanner facility;

at the mobile device, transmitting a preset and prestored scanning template and appropriate identifier via the established connection;

at the scanner facility, receiving the scanning template and the identifier via the established connection, displaying the received scanning template having at least partially completed user specification for specifying an associated scan job, and thereupon awaiting a completion to the user specification if appropriate through a user interface at the scanner facility and a job start indication, and thereupon executing the scan job as specified to create a scan job file and associated meta data; and at the scanner facility, transmitting the scan job file and associated meta data through the established connection to the mobile device and thereupon closing the connection and subsequently removing the scanning template.

2. The method as claimed in claim 1, further comprising:

upon receiving the scanning template and identifier at the scanner facility, opening or accessing a book-keeping account.

3. A system for executing document scanning jobs intended for a mobile device through using a wireless interconnection between the mobile device and a scanner facility, said system comprising:

at the mobile device, means for establishing a wireless connection, means for prestoring at least one preset scanning template and transmitting the at least one scanning template and appropriate identifier via the established connection;

at the scanner facility, means for establishing a wireless connection, and means for receiving the at least one scanning template and the identifier via the connection, user interaction means for displaying the received scanning template having at least partially completed user specification for specifying a scan job, user input means for awaiting an appropriate completion signalization to the user specification and a job start indication, and scanning means activated by the job start indication for executing the scan job as specified to create a scan job file and associated meta data; and at the scanner facility, transmitting means for transmitting the scan job file and associated meta data via the connection to the mobile device, and connection management means for thereupon closing the connection and subsequently removing the scanning template.

4. The system as claimed in claim 3, wherein said connection management means is arranged to close the communication channel upon at least one of the following events:

a user request at the scanner facility, a user request at the work station, a watchdog-controlled delay period elapsing; and a signal strength pertaining to the wireless connection falling below a threshold.

5. The system as claimed in claim 3, wherein the scanning template comprises at least one parameter of the following list: a time stamp, a scan job name, a destination, a transport encryption definition, and a scan job parameter.

6. The system as claimed in claim 5, wherein the scan job parameter is one of the following: single/double sided, zoom parameter, source document format and scan resolution.

7. The system as claimed in claim 3, wherein upon receiving the scanning template and identifier at the scanner facility, the system further comprises means for opening or accessing a book-keeping account.

8. The system as claimed in claim 3, further comprising alarm signaling means for signaling a condition of incomplete and/or suspended transfer.

9. The system as claimed in claim 3, wherein a wireless transport speed of the wireless interconnection is made subject to a wireless signal strength.

10. The system as claimed in claim 3, wherein in case of premature closure of the communication channel, the scanning is then nevertheless executed, but the scan data are saved in the scanner facility.

11. The system as claimed in claim 3, wherein the identifier identifies a particular user.

12. The system as claimed in claim 3, wherein the identifier identifies a particular work station.

13. The system as claimed in claim 3, wherein communications between the mobile device and the, scanner facility are provided based on IEEE 802.11a protocols.

14. The system as claimed in claim 3, wherein the mobile device is one of the following: a workstation, a laptop, a PDA, and a mobile phone.

15. A mobile device for executing document scanning jobs through using a wireless interconnection with a scanner facility, the mobile device comprising:

means for establishing a wireless connection with the scanner facility;

means for prestoring at least one preset scanning template which is to be modified at the scanner facility through a user interface at the scanner facility; and means for transmitting the prestored at least one scanning template and an identifier via the established wireless connection to the scanner facility, and receiving results of a scan job processed at the scanner facility using the modified scanning template.

16. The mobile device as claimed in claim 15, wherein the at least one scanning template includes one or more of the following:

a time stamp, a scan job name, destination information, a transport encryption definition, and a scan job parameter.

17. The mobile device as claimed in claim 15, wherein the mobile device is one of the following: a workstation, a laptop, a PDA, and a mobile phone.

18. The mobile device as claimed in claim 15, wherein the means for transmitting transmits the at least one scanning template and the identifier using IEEE 802.11g protocols.

19. A scanner facility for executing document scanning jobs in cooperation with a mobile device through using a wireless interconnection between said scanner facility and the mobile device, the scanner facility comprising:

means for establishing a wireless connection with the mobile device;

means for receiving at least one prestored and preset scanning template and identifier via the connection from the mobile device;

user interaction means for displaying the received scanning template having at least partially completed user specification for specifying a scan job;

user input means for awaiting an appropriate completion signalization to the user specification and receiving a job start indication directly from a user at the scanner facility;

scanning means activated by the job start indication for executing the scan job as specified to create a scan job file and associated meta data;

transmitting means for transmitting the scan job file and associated meta data via the connection to the mobile device; and connection management means for thereupon closing the connection and subsequently removing the scanning template.

20. The scanner facility as claimed in claim 19, wherein communications between the mobile device and the scanner facility are provided using IEEE 802.11g protocols.

21. The scanner facility as claimed in claim 19, wherein the at least one scanning template includes one or more of the following:

a time stamp, a scan job name, destination information, a transport encryption definition, and a scan job parameter.

* * * * *